United States Patent
Rao et al.

(10) Patent No.: US 6,346,225 B1
(45) Date of Patent: Feb. 12, 2002

(54) PREPARATION OF MODIFIED COKES AND/ OR BLACKS

(75) Inventors: Ningling Rao, Arsley; Pascal Ge; Steen Yde-Andersen, both of Odense, all of (DK)

(73) Assignee: Danionics A/S, Odense (DK)

( * ) Notice: Subject to any disclaimer, the term of this patent is extended or adjusted under 35 U.S.C. 154(b) by 0 days.

(21) Appl. No.: 09/319,831

(22) PCT Filed: Dec. 19, 1997

(86) PCT No.: PCT/EP97/07276

§ 371 Date: Aug. 19, 1999

§ 102(e) Date: Aug. 19, 1999

(87) PCT Pub. No.: WO98/28369

PCT Pub. Date: Jul. 2, 1998

(30) Foreign Application Priority Data

Dec. 20, 1996 (DK) ............................................. 1457/96

(51) Int. Cl.⁷ ............................................. C01B 31/02
(52) U.S. Cl. .................... 423/445 R; 423/460; 264/105
(58) Field of Search .................. 423/445 R, 449.3, 423/460; 264/105, 344, 345

(56) References Cited

U.S. PATENT DOCUMENTS 3,992,218 A    11/1976   Suetsugu et al.
4,115,528 A    9/1978    Christner et al.
4,193,860 A    3/1980    Folser
4,543,305 A    9/1985    Binder et al.
5,955,375 A  * 9/1999    Zondlo ..................... 436/145

FOREIGN PATENT DOCUMENTS

DE     151413      10/1981
EP     0 086 884    8/1983

OTHER PUBLICATIONS

Derwent Abstract, JP 50 027 177B, Sep. 5, 1995.

* cited by examiner

Primary Examiner—Stuart L. Hendrickson
(74) Attorney, Agent, or Firm—Darby & Darby

(57) ABSTRACT

Modified cokes or blacks suitable as alkali metal intercalation electrodes in electrochemical cells are produced by a method comprising boiling the coke or black in concentrated hydrochloric acid, flushing with distilled water, sonicating the coke or black in acetone, and drying the coke or black at a temperature of 150 to 300° C. The modified cokes and blacks produced by this method show Intercalation capacities up to 50% higher than unmodified cokes and blacks, and maintain the high electrolyte compatibility, rate capability and cyclability of the cokes or blacks.

2 Claims, No Drawings

PREPARATION OF MODIFIED COKES AND/OR BLACKS

This invention relates to a process for the preparation of carbon materials, in particular to the preparation of carbon materials of high intercalation capacity, to products obtained thereby and to their use in electrochemical cells Carbon materials such as cokes, blacks and graphites are used as alkali metal intercalation electrode materials in batteries. Of these carbon materials, graphite has the highest intercalation capacity. Theoretically the capacity of graphite is 372 mAh/g, corresponding to the formula $MeC_6$, Me being an alkali metal, and in practical applications, capacities close to this value are obtained. Other carbons such as cokes and blacks show a lower intercalation capacity in the range of 150–200 mAh/g. The reduced capacity of cokes and blacks as compared to graphite is mainly ascribed to their molecular structure and the higher structure of the graphite provides a higher number of intercalation sites compared to cokes and blacks.

However, compared to graphite, cokes and blacks display an advantageously long cycle life as well as a high stability towards a number of solvents commonly used in non-aqueous electrochemical cells. Upon intercalation of lithium, all carbon structures react with the electrolyte materials forming an interphase layer. In the case of graphite the reaction products display low stability and co-intercalation of the reaction products may lead to fast cell degradation. In contrast, the interphase layers formed from cokes and blacks are stable, and only low degradation of cell performance is observed upon extended discharge-charge cycling of such cells.

Furthermore, electrode structures based on cokes and/or blacks display lower impedance compared to structures based on graphite. This phenomenon, which is mainly ascribed to the higher conductivity of the lithiated coke/black structure compared to the lithiated graphite structure, leads to a better rate capability and cyclability for the structures based on cokes and blacks.

The choice of whether to use graphite or cokes or blacks has therefore been a trade-off of higher capacity for a reduced electrolyte compatibility as well as reduced rate capability and cyclability. Previous attempts to improve the capacity of cokes and blacks have been unsuccessful. The attempts have merely focussed on heating the materials to temperatures above 2200° $C_7$ at which temperature they are substantially graphitised. However, graphites obtained in this way suffer from the disadvantages referred to above.

An object of the present invention is to provide a carbon material exhibiting a high intercalation capacity comparable to graphites as well as high electrolyte compatibility, rate capability and cyclability comparable to cokes and blacks.

Surprisingly, this objective can be accomplished by a process for the modification of cokes and blacks comprising acid treatment at elevated temperature, flushing with distilled water, organic solvent processing and drying at elevated temperature. The modified cokes and carbon blacks obtained from such processing show intercalation capacities up to 50% higher than prior to processing, and the high electrolyte compatibility, rate capability and cyclability of these cokes/blacks are also maintained.

By "acid treatment" is meant a washing with acid. Any suitable acid may be used for the first processing step, such as $H_2SO_4$, $HNO_3$, HCI, $HClO_4$, $H_3PO_4$. Preferably the acid is hydrochloric acid.

In a preferred embodiment of the invention the acid is of a high concentration, preferably 4M or more. In a further preferred embodiment, the acid is concentrated hydrochloric acid, i.e. 37% by weight.

The acid treatment is preferably performed at a temperature in the range 60–150° C. In a preferred embodiment of the invention, the cokes and/or blacks are boiled at ambient pressure in hydrochloric acid. The acid treatment is preferably performed for 1 to 2 hours.

The "flushing with distilled water" is preferably carried out for 5 to 60 min. at a temperature in the range 20 to 100° C.

By "organic solvent processing" is meant a washing or a flushing with organic solvent. The solvent for this processing step is a non-aqueous solvent preferably selected from the group of acetone, ethanol and aliphatic or alicyclic organic carbonates, preferably ethylene carbonate and propylene carbonate. Preferably the organic solvent is acetone.

The process may be a Soxhlet extraction process for 1 to 24 hours or an ultrasound treatment for 5 to 60 min, preferably an ultrasound treatment for 10 to 20 min.

The "drying at elevated temperature" is preferably carried out in ambient atmosphere at 150 to 500° C., preferably 150 to 300° C.

U.S. Pat. No. 4,543,305 to the United State of America describes the pretreating of carbon black powder for cathodes for lithium sulfuryl chloride batteries with acetone. The patent, however, does not describe the full four-step process of the present invention, nor does it describe the advantages thereof, particularly the improved alkali metal intercalation properties of the carbon blacks produced.

In a preferred embodiment, the four-step process of the present invention comprises:
  boiling in concentrated hydrochloric acid,
  repeated flushing with distilled water,
  acetone ultrasonication, and
  drying at a temperature in the range 150 to 300° C.

The modified cokes and blacks prepared according to the process of the present invention are characterised in that they display a higher intercalation capacity compared to the corresponding unprocessed material. Further, they display reduced levels of certain impurities.

The higher intercalation capacity is an indication, that the processing has led to a more ordered structure such as that of graphite. On the other hand, traditionally the high structure of graphite has been obtained only at very high temperatures and not at 300° C. or lower. Further, the disadvantages of graphites of reduced electrolyte compatibility, rate capability and cyclability are avoided according to the invention. Although far from fully understood, it seems that the combined steps of the process of the invention have led to modified cokes and/or blacks having an intermediate structure, which provides a increased number of intercalation sites but the modified cokes and/or blacks are far from being a pure graphite. When applied as negative electrode structure in a lithium ion cell, having a positive electrode structure of a transition metal oxide, the potential profile of the negative electrode is unchanged compared to the unmodified coke and/or black, and is clearly distinguished from the potential profile of graphite. It therefore appears, that the intermediate structure obtained provides additional intercalation sites of the "coke/black"-type, which should be distinguished form "graphite"-sites and which do not suffer from the disadvantages characteristic of graphites.

In terms of impurities, the processing leads to cokes and/or blacks having a reduced level of inorganics such as Fe, S, P, Al, Na, and K as well as a reduced level of organics and water adsorbed or chemisorbed on the surface. In the preparation of the modified cokes and/or blacks according to the invention, such impurities may be removed as follows:

inorganics washed away upon treatment in acid e.g. boiling in concentrated hydrochloric acid removal of residual chloride and/or acid upon repeated flushing with distilled water organic impurities extracted under the organic solvent processing e.g. acetone processing removal of water and any volatile material upon drying at elevated temperature.

Chemical analysis of modified cokes and blacks proved the reduction of such impurity levels. However, the chemical analysis also revealed, that at any time such impurities were only present in very low concentrations, far from corresponding to the observed increase in capacity. It has therefore been surprising to observe this significantly increased capacity.

The invention is illustrated by the following non-limiting Examples.

EXAMPLE 1

R-LIBA-A coke from TIMCAL (formerly Lonza) of Switzerland was boiled for 1 hour in concentrated hydrochloric acid, flushed with distilled water for 15 min., ultrasonicated in acetone at 30° C. for 15 min. and finally dried at 200° C. for 24 hours in air.

When tested in an electrochemical cell, the anode being prepared from the above material and an ethylene-propylene-diene-polymethylene (EPDM) binder, the electrolyte being a 1M $LiPF_6$ in 50%/50% by weight of propylene carbonate and ethylene carbonate and the positive electrode being EPDM bound lithium manganese oxide obtained from calcination of lithium carbonate and manganese dioxide, the processed coke displayed a reversible capacity of 280 mAh/g.

COMPARATIVE EXAMPLE 1

For comparison, a cell was prepared similar to the one described in example 1, however, with untreated R-LIBA-A coke. The reversible capacity of the coke of such cell was 190 mAh/g.

EXAMPLE 2

A cell was prepared similar to the one of example 1, except for the acetone ultrasonicating, which was replaced by acetone Soxhlet extraction. The reversible capacity of the coke of such cell was 260 mAh/g.

EXAMPLE 3

A cell was prepared similar to the one of example 1, except for the coke being DB40G coke from Asbury of United States of America. The reversible capacity of the coke of such cell was 240 mAh/g.

COMPARATIVE EXAMPLE 3

For comparison, a cell was prepared similar to the one described in example 3, however, with untreated DB40G coke. The reversible capacity of the coke of such cell was 180 mAh/g.

EXAMPLE 4

A cell was prepared similar to the one of example 3, except for the ultrasonicating being carried out in ethanol. The reversible capacity of the coke of such cell was 225 mAh/g.

EXAMPLE 5

A cell was prepared similar to the one of example 3, except for the ultrasonicating being done in 50%/50% by weight of ethylene carbonate/propylene carbonate. The reversible capacity of the coke of such cell was 230 mAh/g.

EXAMPLE 6

Five cells were prepared similar to the one of example 3, except for the ultrasonicating time being 5 min., 10 min., 20 min., 30 min. and 60 min., respectively. The reversible capacity of the coke of the "5 min." cell was 210 mAh/g, whereas the reversible capacity of the cokes of the four remaining cells all were within the range 240±3 mAh/g.

What is claimed is:

1. A process for the modification of a coke or black comprising:
   (a) boiling said coke or black in hydrochloric acid having a concentration of 4 moles per liter or more;
   (b) flushing said coke or black with distilled water;
   (c) acetone ultrasonicating said coke or black; and
   (d) drying said coke or black at a temperature in the range of 150 to 300° C.

2. The process according to claim 1 wherein the acetone ultrasonicating is carried out for 5 minutes to 60 minutes.

* * * * *